(12) United States Patent
Braun et al.

(10) Patent No.: US 9,631,284 B2
(45) Date of Patent: Apr. 25, 2017

(54) ELECTROCHEMICAL DEVICE FOR SYNGAS AND LIQUID FUELS PRODUCTION

(71) Applicant: Colorado School of Mines, Golden, CO (US)

(72) Inventors: Robert J. Braun, Arvada, CO (US); William L. Becker, Golden, CO (US); Michael Penev, Golden, CO (US)

(73) Assignees: Colorado School of Mines, Golden, CO (US); Alliance for Sustainable Energy, LLC, Golden, CO (US)

( * ) Notice: Subject to any disclaimer, the term of this patent is extended or adjusted under 35 U.S.C. 154(b) by 291 days.

(21) Appl. No.: 14/213,879

(22) Filed: Mar. 14, 2014

(65) Prior Publication Data
US 2014/0272734 A1  Sep. 18, 2014

Related U.S. Application Data

(60) Provisional application No. 61/793,054, filed on Mar. 15, 2013, provisional application No. 61/830,708, filed on Jun. 4, 2013.

(51) Int. Cl.
*C25B 1/00* (2006.01)
*B01D 53/14* (2006.01)
(Continued)

(52) U.S. Cl.
CPC ............ *C25B 1/00* (2013.01); *B01D 53/1418* (2013.01); *B01D 53/52* (2013.01); *C01B 3/384* (2013.01); *C10G 2/32* (2013.01); *C10K 1/04* (2013.01); *C10K 3/04* (2013.01); *C25B 1/12* (2013.01); *B01D 53/1475* (2013.01); *B01D 2251/602* (2013.01); *B01D 2253/1124* (2013.01); *B01D 2257/504* (2013.01);
(Continued)

(58) Field of Classification Search
CPC .. C10G 2/32; C10G 2400/04; C10G 2400/02; B01D 2251/602; B01D 2253/1124; B01D 2257/504; B01D 2258/0283; C10K 1/04; C10K 3/04; C01B 2203/0233; C01B 2203/0238; C01B 2203/0283; C25B 1/12; C25B 1/00
See application file for complete search history.

(56) References Cited

U.S. PATENT DOCUMENTS 7,201,979 B2   4/2007  McElroy et al.
7,807,313 B2   10/2010  Kaye et al.
(Continued)

OTHER PUBLICATIONS

Bents, "High Temperature Solid Oxide Regenerative Fuel Cell for Solar Photovoltaic Energy Storage," 22nd Intersociety Energy Conversion Engineering Conference, Aug. 10-14, 1987, NASA Technical Memorandum 89872, 18 pages.
(Continued)

*Primary Examiner* — Jafar Parsa
(74) *Attorney, Agent, or Firm* — Sheridan Ross P.C.

(57) ABSTRACT

The invention relates to methods for creating high value liquid fuels such as gasoline, diesel, jet and alcohols using carbon dioxide and water as the starting raw materials and a system for using the same. These methods combine a novel solid oxide electrolytic cell (SOEC) for the efficient and clean conversion of carbon dioxide and water to hydrogen and carbon monoxide, uniquely integrated with a gas-to-liquid fuels producing method.

20 Claims, 4 Drawing Sheets

(51) Int. Cl.
*C10G 2/00* (2006.01)
*C10K 1/04* (2006.01)
*C10K 3/04* (2006.01)
*B01D 53/52* (2006.01)
*C01B 3/38* (2006.01)
*C25B 1/12* (2006.01)

(52) U.S. Cl.
CPC ............... *B01D 2258/0283* (2013.01); *C01B 2203/0233* (2013.01); *C01B 2203/0238* (2013.01); *C01B 2203/0283* (2013.01); *C01B 2203/043* (2013.01); *C01B 2203/0495* (2013.01); *C01B 2203/062* (2013.01); *C01B 2203/067* (2013.01); *C01B 2203/0833* (2013.01); *C01B 2203/0872* (2013.01); *C01B 2203/1258* (2013.01); *C01B 2203/148* (2013.01); *C10G 2400/02* (2013.01); *C10G 2400/04* (2013.01); *Y02E 50/13* (2013.01); *Y02E 50/32* (2013.01); *Y02E 60/366* (2013.01); *Y02E 60/566* (2013.01); *Y02P 20/129* (2015.11); *Y02P 20/152* (2015.11)

(56) References Cited

U.S. PATENT DOCUMENTS

| | | | |
|---|---|---|---|
| 8,637,197 B2 | 1/2014 | Braun et al. | |
| 2004/0197239 A1* | 10/2004 | Mirkovic | F23N 3/002 422/105 |
| 2005/0048334 A1 | 3/2005 | Sridhar et al. | |
| 2011/0071331 A1* | 3/2011 | Basset | B01J 31/121 585/700 |
| 2012/0241678 A1* | 9/2012 | Valentin | B01D 53/047 252/373 |
| 2012/0282534 A1 | 11/2012 | Braun et al. | |
| 2014/0194539 A1* | 7/2014 | Hammad | C01B 3/38 518/704 |

OTHER PUBLICATIONS

Becker et al., "Production of Fischer-Tropsch liquid fuels from high temperature solid oxide co-electrolysis units," Energy, 2012, vol. 47, Iss. 1, pp. 99-115.

Bierschenk et al., "High efficiency electrical energy storage using a methane-oxygen solid oxide cell," Energy Environ. Sci., Dec. 20, 2010, available at www.pubs.rsc.org/doi:10.1039/C0EE00457, 8 pages.

McElroy et al., "Optimization & Demonstration of a Solid Oxide Regenerative Fuel Cell System," Technical Progress Report—Year 1, U.S. Dept. of Energy National Energy Technology Lab., Dec. 2004, 35 pages.

Petri, "Advanced Materials for RSOFC Dual Operation with Low Degradation," Versa Power Systems, DOE Hydrogen Program Review, Jun. 11, 2010, 21 pages.

"Versa Power, Boeing in DARPA contract for ultra-long-flight aircraft," Fuel Cells Bulletin, Jan. 2011, vol. 2011, issue No. 1, pp. 4-5.

Wendel et al., "Modeling and Design of a Novel Solid Oxide Flow Battery System for Grid-Energy Storage," 10th Europea SOFC Forum, Jun. 26-29, 2012, pp. 80-90.

Wikipedia, "Sabatier reaction," Mar. 4, 2012, available at www.en.wikipedia.org/wiki/Sabatier_reaction, 3 pages.

Wikipedia, "Solid oxide fuel cell," Mar. 20, 2012, available at www.en.wikipedia.org/w/index.php?title=Solid_oxide_fuel_cell&oldid=482944085, 11 pages.

Wikipedia, "Water gas shift reaction," Jan. 23, 2012, available at www.en.wikipedia.org/w/indiex.php?title=Water_gas_shift_reaction_&_oldid=472764046, 3 pages.

Xu et al., "A novel solid oxide redox flow battery for grid energy storage," Energy Environ. Sci., 2011, vol. 4, pp. 4942-4846.

Official Action for U.S. Appl. No. 13/432,219, mailed Oct. 26, 2012, 8 pages.

Official Action for U.S. Appl. No. 13/432,219, mailed May 23, 2013, 8 pages.

Notice of Allowance for U.S. Appl. No. 13/432,219, mailed Sep. 18, 2013, 11 pages.

* cited by examiner

ELECTROCHEMICAL DEVICE FOR SYNGAS AND LIQUID FUELS PRODUCTION

CROSS REFERENCE TO RELATED APPLICATIONS

This application claims priority under 35 U.S.C. §119(e) to U.S. Provisional Application Ser. No. 61/830,708, filed Jun. 4, 2013, and U.S. Provisional Application No. 61/793,054, filed Mar. 15, 2013, each of which is incorporated by reference herein in their entirety.

GOVERNMENT INTEREST

This invention was made with government support under award number KXEA-3-33607-54 awarded by the National Renewable Energy Laboratories (NREL). The U.S. Government has certain rights in the invention.

TECHNICAL FIELD

The invention relates to methods for creating high value liquid fuels, such as gasoline, diesel, and jet using carbon dioxide and water as the starting raw materials. These methods combine a novel solid oxide electrolytic cell (SOEC) for the efficient and clean conversion of these feedstocks to hydrogen and carbon monoxide (syngas), with the SOEC uniquely integrated with a gas-to-liquid fuels process.

BACKGROUND OF INVENTION

Energy consumption in the United States and throughout the world continues to increase. As the demand for energy increases, additional methods for producing energy are developed. Concerns about the increased waste and pollutants produced by many of the conventional energy production processes, and the low efficiencies of such processes, have led to further research for cleaner, safer, and more readily available energy sources. In particular, development and application of both renewable energy technologies and energy policy has led to increasing renewable energy utilization (solar, wind, geothermal) for power and energy production. Large-scale energy storage development is envisioned as a key requirement to enable significant penetration of renewable resources into the electric grid.

In response to increasing energy production requirements and the desire to reduce or eliminate pollutants from energy sources, new, cleaner fuel sources are being sought for a variety of applications, especially for transportation fuels. A known source of cleaner fuels includes synthetic fuels made from synthesis gas, or syngas, by so-called gas-to-liquid conversion processes.

However, standard methods for the production of syngas are fraught with technical challenges and, as a result, cost challenges. Syngas is produced by steam reforming of methane, coal gasification or biomass gasification. Steam reforming catalytically reacts methane gas with water to form syngas. The process operates at high temperature (greater than about 800° C.) and pressure (as high as about 100 bar) and typically requires expensive solid catalysts. Methane-steam reforming is one of the most common and cost-effective methods for the production of syngas, but it also consumes a gaseous fossil fuel in order to provide the feedstock to a liquid fuel synthesis reactor.

Coal gasification refers to the thermochemical conversion of coal, in a limited oxygen environment, to produce syngas. However, the syngas product stream resulting from coal gasification typically contains numerous contaminants, including benzene, toluene, volatile organics, polycyclic aromatic hydrocarbons, halides, mercury, hydrogen and carbonyl sulfides, and tars. Since many downstream gas-to-liquid conversion processes require a clean syngas feed stream, syngas from coal gasifiers requires additional treatment to remove these contaminants, including particulate scrubbing, halide removal, mercury removal, tar mitigation, and desulfurization. The cleaning steps result in higher capital and operating costs, which in turn increase the cost per standard cubic foot of clean syngas produced (unit cost).

Biomass gasification faces many of the same syngas contaminant challenges. Thermochemical conversion of biomass (e.g. cellulose, hemicellulose, lignin) produces a wide range of compounds, including oxygenates, aromatic hydrocarbons, phenolics, in addition to benzene, toluene and higher molecular weight tars. One study identified 230 separate chemical compounds formed by the thermal degradation of wood, in addition to carbon monoxide and hydrogen. As a result, syngas produced by biomass gasification, like coal gasification, requires significant processing before the syngas may be used in a gas-to-liquid process. Syngas tar removal is particularly complicated and costly, requiring processing steps like wet and/or dry scrubbing towers, tar cracking, acid gas removal, demisters, coalescers, and/or candle filters. This additional processing increases costs, energy requirements, and ultimately increases syngas unit cost.

The cost to produce syngas directly impacts the economic viability of the downstream gas-to-liquid conversion processes. One such process is the Fisher-Tropsch process, which converts syngas to long chained alkanes, including diesel and jet fuel. However, even today's Fisher-Tropsch processes are complex, costly and energy intensive. As a result, Fisher-Tropsch technology has seen limited industrial-scale use. On exception is South Africa, a country with large coal reserves but very little oil. The economic viability of Fisher-Tropsch technology in most of the world depends on the costs of crude oil compared to the costs of producing alternative fuels. However, given the historically volatile nature of natural gas costs, the political uncertainty of coal, and the rising global demand for crude oil, alternative syngas and gas-to-liquid technologies, and methods to integrate these technologies, is needed. In addition, linking the upstream syngas processes with downstream gas-to-liquid conversion processes requires innovative and novel heat integration methods. Otherwise, such new alternative energy concepts may not be able to compete with the relatively low cost of crude oil.

One promising new option for syngas/synfuel production is high temperature electrolysis technology which can also utilize intermittent renewable energy and provide energy storage in the form of liquid fuels. High temperature solid-oxide fuel cells may be used to produce electricity and water from hydrogen and oxygen. When run in reverse, a solid-oxide fuel cell acts as a solid-oxide electrolytic cell (SOEC), which is capable of electrolytically reducing water and carbon dioxide into hydrogen, carbon monoxide, and oxygen. Thus, water and carbon dioxide may be directly converted into a clean syngas (made up of hydrogen and carbon monoxide). In a solid-oxide fuel cell, the fuel electrode (i.e., the anode) is the oxidizing gas electrode and the air electrode (i.e., the cathode) is the reducing electrode. When operated in reverse, as a solid-oxide electrolytic cell, the polarity of the cell is switched in which the fuel electrode becomes the cathode reducing the incoming reactants and the oxidant electrode becomes the anode. It has been shown that an SOEC may be used for high temperature co-electrolysis of water and carbon dioxide to produce clean hydrogen and carbon monoxide, thus eliminating the costly tar and contaminant removal steps present in coal and biomass gasification processes.

The present invention provides a novel method for producing syngas, integrated with a gas-to-liquid conversion process that addresses the above-mentioned problems.

SUMMARY OF INVENTION

The present invention discloses a novel fuel production method that integrates an optimized upstream, high temperature solid oxide co-electrolysis system for the production of clean syngas from carbon dioxide and steam with a downstream gas-to-liquid conversion process to produce liquid hydrocarbon fuels. One aspect of the present invention is a novel heat integration method that utilizes a fraction of the liquid fuel produced to provide the SOEC's thermal energy requirements. In addition, the present invention discloses further integration between the up- and downstream processes, which generates steam, reuses plant water, and recycles Some or all of the hydrogen derived from the syngas and fuel synthesis processing steps back to the SOEC. This hydrogen recycle reduces SOEC operational costs and, therefore, the unit cost of the syngas produced.

An aspect of the present invention comprises a method to produce liquid fuels from flue gas. The method comprises producing a fuel gas in a power plant, wherein the flue gas comprises carbon dioxide and providing the flue gas to a solid oxide electrolytic cell, wherein the carbon dioxide in the flue gas reacts at a cathode of the solid oxide electrolytic cell to produce syngas, and wherein power produced in the power plant powers the solid oxide electrolytic cell.

An aspect of the present invention comprises a method for producing liquid fuels. The method comprises preparing a feed stream comprising carbon dioxide (which may comprises a substantial part of the feed stream) and water, utilizing a liquid oxidation method to remove hydrogen sulfide from the feed stream to form a scrubbed feed stream, utilizing a zinc oxide bed to polish the scrubbed feed stream to produce a polished feed stream, heating the polished feed stream to produce a heated feed stream, wherein the heated feed stream has a temperature between about 800° C. to about 850° C., compressing an air stream to a pressure between about 1.0 bar to about 2.0 bar to produce a pressurized air stream, heating the pressurized air stream to produce a heated air stream, wherein the heated air stream has a temperature of about 750° C. to about 850° C., reacting the heated feed stream and the heated air stream in a solid oxide electrolytic cell to form a syngas, and converting the syngas stream to the liquid fuels.

An aspect of the present invention comprises a method for producing liquid fuels, comprising preparing a feed stream comprising carbon dioxide and water, heating the feed stream to produce a heated feed stream, compressing an air stream to produce a pressurized air stream, heating the pressurized air stream to produce a heated air stream, reacting the heated feed stream and the heated air stream in a solid oxide electrolytic cell to form a syngas and an oxygen-containing stream, wherein the electrolytic cell comprises a cathode and an anode, treating the syngas to produce a treated syngas, and converting the syngas to form the liquid fuels.

This Summary of the Invention is neither intended nor should it be construed as being representative of the full extent and scope of this disclosure. Moreover, references made herein to "the present disclosure" or aspects thereof, should be understood to mean certain embodiments and should not necessarily be construed as limiting all embodiments to a particular description. The present invention is set forth in various levels of detail in the Summary of the Invention as well as in the attached drawings and the Description of Embodiments and no limitation as to the scope is intended by either the inclusion or non-inclusion of elements, components, etc. in this Summary of the Invention. Additional aspects will become more readily apparent from the Description of Embodiments, particularly when taken together with the drawings.

DESCRIPTION OF EMBODIMENTS

Figure 1:
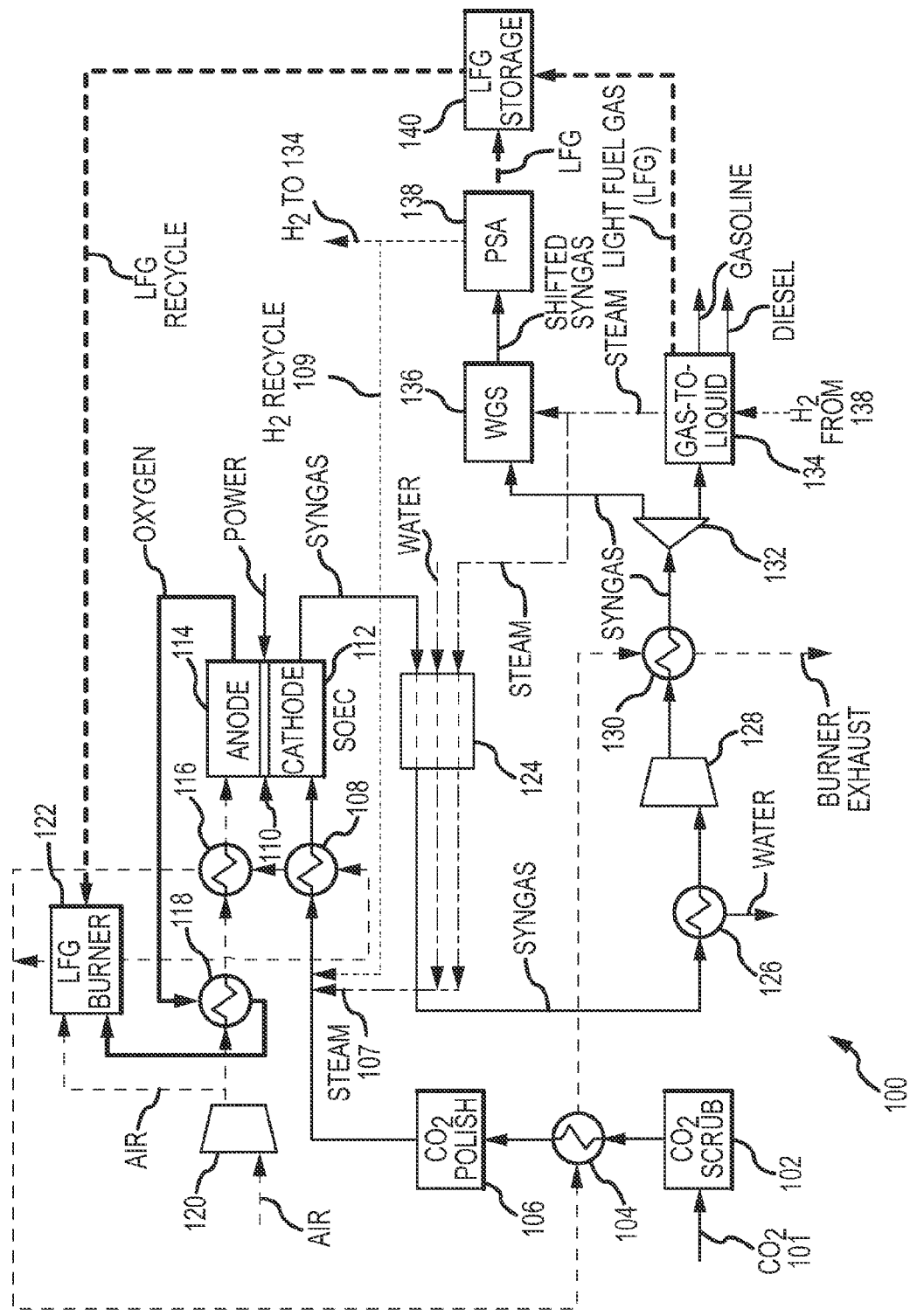
FIG. 1 illustrates an integrated SOEC syngas producing process with a gas-to-liquid conversion process.

The following detailed description illustrates the invention by way of examples and not by way of limitation. This description will clearly enable one skilled in the art to make and use the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention relates to methods for creating high value liquid fuels, such as gasoline, diesel, jet, and light fuel gases, using carbon dioxide and water as the starting raw materials. These methods combine a solid oxide electrolytic cell (SOEC) for the efficient and clean conversion of carbon dioxide and water to syngas, uniquely integrated with a gas-to-liquid fuel producing process.

An aspect of the present invention is a method that produces liquid fuels. The method comprises preparing a feed stream comprising carbon dioxide and water, heating the feed stream to produce a heated feed stream, compressing an air stream to produce a pressurized air stream, heating the pressurized air stream to produce a heated air stream, reacting the heated feed stream and the heated air stream in a solid oxide electrolytic cell (SOEC) to form a syngas and an oxygen-containing stream, wherein the electrolytic cell comprises a cathode and an anode. The syngas stream is treated to produce a treated syngas stream, thereby converting the syngas to produce the liquid fuels.

In some embodiments, the carbon dioxide may be supplied from a single source, by way of example, from a carbon capture system or as byproduct from a fermentation process. Alternatively, the carbon dioxide may be supplied from multiple sources. Multiple carbon dioxide sources may be combined prior to processing to produce syngas.

A carbon capture system may comprise a liquid system, solid adsorption, membrane separation, ionic liquid system, cryogenic separation, low temperature distillation, oxy-combustion, or a combination thereof or the like. More specifically, a liquid system may comprise the use of liquid amines to remove carbon dioxide from a coal burning power plant's flue gas, by the reversible reaction of the carbon dioxide with the amine to form soluble carbonate salt, followed by elevated temperature regeneration to reform and release the carbon dioxide. Liquid amines may include, but are not limited to, monoethanolamine (MEA), methyldiethanolamine (MDEA), 2-amino-2-methylpropanol (AMP), piperazine (PIPA), diglycolamine (DGA), diethanolamine (DEA), di-isopropanolamine (DIPA) and mixtures thereof. Other examples of specific amine carbon dioxide capture systems include, but are not limited to, Selexol™, Rectisol™, and the Praxair Advanced Amine Technology. Other liquid system carbon dioxide capture systems may include ammonia scrubbing systems. Solid adsorption carbon dioxide capture systems may include, but are not limited to, solid adsorbents impregnated with liquid amines, solid amines, silver oxide, lithium hydroxide, limestone, activated carbon, zeolites, molecular sieves, alumina, bicarbonate resins, and combinations thereof. Adsorption may be pressure-swing or temperature-swing adsorption. Mechanical methods for carbon dioxide capture may include, but are not limited to, vortex contactors and shear jet absorbers. Membrane systems may include, but are not limited to, polyimide/polystyrene nanocomposite membranes, polypropylene hollow fiber membranes, ceramic membranes, zeolite membranes and combinations thereof.

In some embodiments of the present invention, prior to or following treatment using a carbon dioxide capture system, the feed stream may comprise greater than about 95 vol % carbon dioxide. In some embodiments, the feed stream may comprise greater than about 96 vol %, about 97 vol %, about 98 vol %, about 99 vol % or about 99.9 vol % carbon dioxide. In some embodiments of the present invention, the feed stream may have a carbon dioxide concentration of between about 90 mole % to about 99.9 mole %, with the balance containing no more than 10% nitrogen and less than 1% $H_2S$ or COS. In still further embodiments, the feed stream may also contain methane, ethane and other heavier hydrocarbons.

In some embodiments of the present invention, the SOEC feed stream may have a pressure of between about 1 bar and about 20 bars (all pressures are absolute pressures). In some embodiments, the SOEC feed stream pressure may be about 1.02 bar, about 3 bar, about 5 bar, about 7 bar, about 9 bar, about 10 bar, about 15 bar, or about 20 bar. In some embodiments, the feed stream may have a pressure of about 1 bar, about 1.2 bar, about 1.4 bar, about 1.6 bar, about 1.8 bar, about 2.0 bar, about 2.2 bar, about 2.4 bar, about 2.6 bar, about 2.8 bar or about 3 bar. In some embodiments of the present invention, the preferred pressure of the SOEC (and feed gases) is about 1.6 bar which may help to mitigate the need for additional downstream compression as a result of system pressure drops.

In some embodiments of the present invention, the SOEC feed stream to the fuel electrode may comprise between about 30 mole % to about 33 mol % of carbon dioxide and between about 60 mole % to about 70 mol % of water.

In some embodiments of the present invention, water may be added to the feed stream comprising carbon dioxide and water, after the carbon capture system has purified the source carbon dioxide stream (e.g. power plant flue gas, natural gas oxy-combustion process). In some embodiments of the present invention, the water may be added to the feed stream comprising carbon dioxide and water as pressurized steam. In some embodiments of the present invention, the steam may be saturated steam at a pressure of between about 1 bar and about 30 bars. In some embodiments, the saturated stream pressure may be about 1.02 bar, about 3 bar, about 5 bar, about 7 bar, about 9 bar, about 10 bar, about 15 bar, about 20 bar, or about 25 bar. In some embodiments, the saturated steam pressure may be about 1 bar, about 1.2 bar, about 1.4 bar, about 1.6 bar, about 1.8 bar, about 2.0 bar, about 2.2 bar, about 2.4 bar, about 2.6 bar, about 2.8 bar or about 3 bar. In some embodiments of the present invention, the steam is at a temperature between about 10° C. and about 281° C. In some embodiments of the present invention, the steam is at about 24 bar and about 225° C. In some embodiments of the present invention, the steam may be produced in the gas-to-liquid process and recycled to the feed preparation step.

In some embodiments of the present invention, the feed stream may be heated by a heat-exchanger to produce a heated feed stream. In some embodiments of the present invention, the heated feed stream may have a final temperature of about 750° C. to about 800° C. The temperature of the heated feed stream may be about 750° C., about 760° C., about 770° C., about 780° C., about 790° C., or about 800° C. In some embodiments of the present invention, the feed stream heat-exchanger may be a shell-and-tube, spiral wound, or any other suitable heat-exchanger. The heating medium to heat the feed stream may be a hot flue gas or a combustion gas. Alternatively, some or all of the thermal energy addition required by the feed stream may be supplied by a liquid heat transfer fluid such as DowTherm™.

In some embodiments of the present invention, the air stream may be pressurized to produce a pressurized air stream using fans, blowers, compressors or a combination thereof. The air compressor may be centrifugal, mixed-flow, axial-flow, reciprocating, rotary screw, rotary vane, scroll, diaphragm compressor, or a combination thereof. In some embodiments of the present invention, the pressurized air stream may have a pressure between about 1 bar to about 20 bars. In some embodiments, the pressurized air stream may have a pressure of about 1 bar, about 1.2 bar, about 5 bar, about 10 bar, about 15 bar, or about 20 bar. In some embodiments, the pressurized air stream may have a pressure of about 1 bar, about 1.2 bar, about 1.4 bar, about 1.6 bar, about 1.8 bar, about 2.0 bar, about 2.2 bar, about 2.4 bar, about 2.6 bar, about 2.8 bar or about 3 bar.

In some embodiments of the present invention, the pressurized air stream may be heated by a heat-exchanger to produce a heated air stream. In some embodiments of the present invention, the heated air stream may have a final temperature of about 750° C. to about 850° C. In some embodiments, the final temperature of the heated air stream may be about 750° C., about 760° C., about 770° C., about 780° C., about 790° C., about 800° C., about 810° C., about 820° C., about 830° C., about 840° C. or about 850° C. In some embodiments of the present invention, the air stream heat-exchanger may be a shell-and-tube, plate-fin, micro-channel, spiral wound, or any other suitable heat-exchanger. The heating medium to heat the air stream may be a hot flue gas or a combustion gas. Alternatively, some or all of the thermal energy addition required by the feed stream may be supplied by a liquid heat transfer fluid such as Dow-Therm™.

In some embodiments of the present invention, the heated feed stream and the heated air stream may be reacted in a solid oxide electrolytic cell (SOEC) to produce syngas and an oxygen-containing stream. The feed stream may be reacted at a cathode in the SOEC and the air stream may be reacted at an anode of the SOEC, where the cathode and anode may be separated by an electrolyte. In some embodiments of the present invention, the SOEC may operate at a temperature of about 600° C. to about 900° C. In some embodiments of the present invention, the SOEC may operate at a temperature of about 600° C., about 620° C., about 640° C., about 660° C., about 680° C., about 700° C., about 720° C., about 730° C., about 740° C., about 750° C., about 760° C., about 770° C., about 780° C., about 790° C., about 800° C., about 810° C., about 820° C., about 830° C., about 840° C. or about 860° C., about 880° C., or about 900° C. In some embodiments, the cathode may operate at a temperature between about 750° C. to about 850° C., and the anode may operate at a temperature between about 750° C. to about 850° C.

In some embodiments of the present invention, the SOEC may operate at a pressure between about 1 bar to about 20 bars. In some embodiments, the SOEC may operate at a pressure of about 1.02 bar, about 3 bar, about 5 bar, about 7 bar, about 9 bar, about 10 bar, about 15 bar or about 20 bar. In some embodiments, the SOEC may operate at a pressure of about 1 bar, about 1.2 bar, about 1.4 bar, about 1.6 bar, about 1.8 bar, about 2.0 bar, about 2.2 bar, about 2.4 bar, about 2.6 bar, about 2.8 bar or about 3 bar. In some embodiments of the present invention, the SOEC may operate at a pressure of about 1.6 bar, which may help to mitigate the need for additional downstream compression as a result of system pressure drops.

In some embodiments of the present invention, the cathode and anode may be constructed of any suitable material including, but not limited to, $(La,Sr)(Fe,Co)O_3$ (LSCF), $(Sm,Sr)CoO_3$, and Sr-doped $LaMnO_3$ for the air electrode (anode) and Ni—YSZ, Ni—ScSZ, $La_2NiO_4$, and Ni—$ZrO_2$ for the fuel electrode (cathode). Electrode support materials and functional layers include nickel cermets, and other electronic conductors such as $(Sr_{0.8}La_{0.2})TiO_3$ (SLT). The electrolyte may be comprised of any suitable material with examples including, but not limited to, yttria-stabilized zirconia (YSZ), $(La_{0.6}Sr_{0.4})(Ga_{0.8}Mg_{0.2})O_3$ (LSGM), Sc-stabilized zirconia (SSZ), and doped ceria. SOEC cell architecture includes both electrode- and electrolyte-supported cell constructions and ceramic or metallic interconnects.

In some embodiments of the present invention, the oxygen-containing stream may be used to preheat the pressurized air stream to produce a preheated anode gas stream, prior to the heating step, using the sensible heat of the oxygen-containing stream. Preheating may be accomplished in any suitable heat-exchanger.

In some embodiments of the present invention, the syngas produced by the SOEC may be used to heat the water/steam mixed with the feed stream prior to mixing the steam with the feed stream. This heating may utilize the sensible latent heat of the syngas in any suitable heat-exchanger.

In some embodiments of the present invention, the syngas may be treated to produce a treated syngas. The treating step may comprise recovering the syngas sensible and/or latent heat to preheat the water fed to the feed stream. This preheating may be accomplished in a heat-exchanger. The heat-exchanger may be any suitable heat-exchanger including, but not limited to, a shell-and-tube, tube-in-tube, plate-fin, microchannel, or a spiral wound heat-exchanger. In some embodiments of the present invention, the treating step may include a steam Rankine cycle to generate electricity. In some embodiments of the present invention, the treating step may include a separating step to remove condensable components from the syngas, wherein the condensable components may comprise at least water to produce dry syngas. Any suitable condenser including, but not limited to, a shell-and-tube or plate-and-frame condenser may be used for the separating step. In some embodiments of the present invention, the condensable components may be condensed by cooling the syngas to a temperature of less than about 50° C., about 48° C., about 46° C., about 44° C., about 42° C., about 40° C., about 38° C., about 36° C. or about 34° C. to produce the dry syngas. In some further embodiments of the present invention, the syngas may be cooled to a temperature of about 30° C. to about 50° C. The cooling medium used to condense may be any suitable cooling medium for example cooling-tower water, chilled water or refrigerant. In some embodiments of the present invention, the treating step may include compressing the dry syngas using a compressor. The syngas compressor may be centrifugal, mixed-flow, axial-flow, reciprocating, rotary screw, rotary vane, scroll, diaphragm compressor, or a combination thereof. In some embodiments of the present invention, the pressurized syngas may have a pressure of greater than about 30 bar, about 35 bar, about 40 bar, about 45 bar, about 50 bar or about 60 bar. In some embodiments of the present invention, the treating step may include various heat transfer steps including, but not limited to, heating the pressurized syngas using a flue gas or combustion gas. In some embodiments of the present invention, the syngas may be heated using a flue gas or combustion gas between about 300° C. to about 1000° C. In some embodiments, the syngas may be heated to at least about 180° C., about 190° C., about 200° C., about 210° C., about 220° C., about 230° C., about 240° C., about 250° C., about 260° C., about 270° C., about 280° C., about 290° C., about 300° C., about 310° C., about 320° C., about 330° C., about 340° C. or about 350° C. In some further embodiments of the present invention, the syngas may be heated to at least about 180° C., about 190° C., about 200° C., about 210° C., about 220° C., about 230° C., about 240° C. or about 250° C. In addition, the pressurized syngas may provide heat to other parts of the up- and downstream process. In some further embodiments of the present invention, the pressurized syngas may be used to generate electricity in a second steam Rankine cycle step.

In some embodiments of the present invention, the pressurized syngas and/or the treated syngas may be converted to produce liquid fuels. In some embodiments of the present invention, the syngas may be converted to liquid fuels including, but not limited to, diesel, jet, gasoline, and light fuel gas by Fisher-Tropsch methods. In some embodiments of the present invention, the Fisher-Tropsch method may comprise a Fisher-Tropsch synthesis reactor, a distillation step wherein the distillation system may produce intermediate streams selected from the group consisting of a naptha stream, a middle distillate stream, a wax stream and combinations thereof. A naptha stream may be processed in a naptha hydrotreating step to create a hydrotreated stream, wherein some or all of the hydrotreated stream may be directed to an isomerization step to create an isomerized stream, wherein another portion of the hydrotreated stream may be directed to a catalytic reforming step to create a reformed stream, wherein both the hydrotreated stream and the reformed stream may be combined to produce a gasoline stream. The middle distillate stream may also be hydrotreated in a distillation hydrotreating step to produce a hydrotreated distillate stream. The wax stream may processed in a wax hydrocracking step to produce a hydrocracked stream. The hydrotreated distillate stream and the hydrocracked stream may be combined to produce a diesel stream. Any one or combination of the Fisher-Tropsch synthesis reactor, distillation step, naptha hydrotreating step, distillation hydrotreating step, wax hydrocracking step, isomerization step, and/or catalytic reforming step may produce a light fuel gas (LFG), which may be collected and recycled to the LFG burner to provide the heat requirements of the SOEC system.

In some embodiments of the present invention, the Fisher-Tropsch synthesis reactor may comprise a fixed-bed reactor utilizing a solid catalyst. The Fisher-Tropsch synthesis reactor may comprise a slurry reactor. In some embodiments, the catalyst may comprise a transition metal. In some embodiments, the catalyst may be selected from the group consisting of cobalt, iron, nickel and ruthenium.

In some embodiments of the present invention, preparing the feed stream may comprise removing hydrogen sulfide from the feed stream to produce a scrubbed feed stream. The hydrogen sulfide removal step may be performed prior to or following the carbon dioxide capture step. In some embodiments of the present invention, hydrogen sulfide may be scrubbed from the feed stream using a liquid oxidation process, such as LO-CAT™. This may result in a scrubbed feed stream with $H_2S$ concentrations ranging from about 10 ppm to about 100 ppm $H_2S$. In some embodiments of the present invention, the scrubbed feed stream may be polished utilizing a zinc oxide bed to produce a polished feed stream. In some embodiments, the polished feed stream may have a final hydrogen sulfide concentration of between about 0.1 ppm to about 1 ppm. In some embodiments of the present invention, the polished feed stream may have a final hydrogen sulfide concentration of less than about 10 ppm, about 9 ppm, about 8 ppm, about 7 ppm, about 6 ppm, about 5 ppm, about 4 ppm, about 3 ppm, about 2 ppm or about 1 ppm. In some further embodiments of the present invention, the polished feed stream may have a final hydrogen sulfide concentration of less than about 1 ppm. In some embodiments of the present invention, the feed stream may first be treated with a liquid oxidation process to remove about most of the hydrogen sulfide, followed by a polishing zinc oxide step to reduce the hydrogen sulfide present in the feed stream to less than about 1 ppm.

In some embodiments of the present invention, preparing the feed stream may comprise mixing hydrogen with the feed stream, scrubbed feed stream, polished feed stream or a combination thereof to produce an enriched feed stream. The hydrogen addition to the carbon dioxide and water may extend the life of the SOEC's cathode and may increase the reaction rate of the electrolysis reaction of steam to hydrogen. In some embodiments of the present invention, the hydrogen addition may be derived from a recycle stream separated from the syngas produced by the SOEC. In some embodiments of the present invention, the hydrogen may be provided by an independent supply source unassociated with the present invention.

In some embodiments of the present invention, the treated syngas may be split in a splitting step to produce a syngas side-stream and a main syngas stream. In some embodiments of the present invention, between about 2 mass % to about 5 mass % of the treated syngas may be directed to the syngas side-stream. In some embodiments, less than about 10 mass %, about 9 mass %, about 8 mass %, about 7 mass %, about 6 mass %, about 5 mass %, about 4 mass %, about 3 mass %, about 2 mass %, or about 1 mass % of the treated syngas may be directed to the syngas side-stream. In some further embodiments of the present invention about 5 mass %, about 4 mass %, about 3 mass %, about 2 mass %, or about 1 mass % of the treated syngas may be directed to the syngas side-stream. In some further embodiments of the present invention, less than about 2 mass % of the treated syngas may be directed to the syngas side-stream. The remainder of the treated syngas may be directed to the main syngas stream for converting to liquid fuels (e.g., by Fisher-Tropsch processing).

In some embodiments of the present invention, the syngas side-stream may be treated in a water-gas-shift reactor to produce a shifted syngas stream, wherein the reactor may catalyze the water-gas-shift reaction to increase the content of hydrogen present in the shifted syngas stream relative to the hydrogen content of the syngas side-stream.

In some embodiments of the present invention, the water-gas-shift (WGS) reactor may comprise using a solid catalyst selected from the group consisting of a transition metal, transition metal oxides, and mixtures thereof or any other suitable catalyst. The WGS catalyst may comprise iron oxides. The WGS reactor may comprise a single stage or a two stage process. The WGS reaction may be completed at relatively low temperatures in the presence of a catalyst, with temperatures between about 150° C. to about 1000° C. In some embodiments, the WGS reaction may be completed without a catalyst at elevated temperatures between about 500° C. and about 1500° C. In some embodiments of the present invention, the WGS reaction may be completed at pressures ranging from about atmospheric pressure to about 30 bar.

In some embodiments of the present invention, some or all of the water contained in the product from the WGS is removed, to form a dried shifted syngas stream. Methods for removing the water include, but are not limited to, condensation using a heat exchanger.

In some further embodiments of the present invention, the dried shifted syngas stream may be separated such that some or all of the dried shifted syngas stream's hydrogen content may be removed to produce a hydrogen recycle stream. In some embodiments of the present invention, between about 3 mass % to about 5 mass % of the dried shifted syngas stream may be separated to create the hydrogen recycle stream. In some embodiments, greater than about 3 mass %, about 4 mass %, or about 5 mass % of the dried shifted syngas stream may be separated to create the hydrogen recycle stream.

Any suitable separation may be used to separate the hydrogen from the dried shifted syngas stream including, but not limited to, pressure swing adsorption (PSA) and membrane technology. Hybrid membrane/PSA systems may also be used.

In some embodiments of the present invention, PSA may be used to produce a hydrogen recycle stream. In some embodiments of the present invention, the dried shifted syngas stream feeding a PSA system has a hydrogen molar concentration greater than about 70 mol %.

In some embodiments of the present invention, between about 70 mass % to about 80 mass % of the purified hydrogen stream from the PSA may be utilized to create the hydrogen recycle stream. In some embodiments, greater than about 70 mass %, about 80 mass %, about 90 mass %, or about 95 mass % of the purified hydrogen stream from the PSA may be utilized to create the hydrogen recycle stream. In some embodiments of the present invention, the hydrogen recycle stream may be directed to the feed stream (e.g., the feed stream, scrubbed feed stream, polished feed stream or heated feed stream).

An aspect of the present invention is a method for producing liquid fuels comprising preparing a feed stream comprising carbon dioxide and water, removing hydrogen sulfide by scrubbing the feed stream utilizing a liquid oxidation process to form a scrubbed feed stream, polishing the scrubbed feed stream utilizing a zinc oxide bed to produce a polished feed stream, heating the polished feed stream to produce a heated feed stream, wherein the heated feed stream has a temperature of between about 750° C. to about 850° C., compressing an air stream to a pressure of between about 1.0 bar to about 2.0 bar to produce a pressurized air stream, heating the pressurized air stream to produce a heated air stream, wherein the heated air stream has a temperature of between about 750° C. to about 850° C., reacting the heated feed stream and the heated air stream in a solid oxide electrolytic cell to form a syngas and an oxygen-containing stream, separating condensable components from the syngas to produce a dry syngas, wherein the condensable components comprise at least water, and wherein condensing comprises cooling the syngas to a temperature of less than about 40° C., compressing the dry syngas to produce a pressurized syngas, wherein the pressurized syngas has a pressure of at least about 35 bar, heating the dry syngas to produce a heated syngas, wherein the heated syngas has a temperature of at least about 220° C., splitting the dry syngas to produce a syngas side-stream and a main syngas stream, wherein the syngas side-stream comprises less than about 4 mass % of the dry syngas stream and the main syngas stream comprises about the remainder of the heated syngas, shifting the syngas side-stream utilizing a water-gas shift reactor to produce a shifted syngas stream with a hydrogen content higher than the hydrogen content of the syngas side-stream, separating some or all of the hydrogen content from the shifted syngas stream to produce a hydrogen recycle stream, feeding the hydrogen recycle stream to the feed stream heating step and converting the main syngas stream to produce the liquid fuels.

In some embodiments of the present invention, at least some of the light fuel gas produced by the syngas converting process (e.g. to produce liquid fuels by Fisher-Tropsch processing), may be combusted in a burner to produce a first combustion gas. In some further embodiments of the present invention, some or all of the sensible and/or latent heat of the first combustion gas may be used to preheat the polished feed stream to produce the heated feed stream and a second combustion gas. The first combustion gas may be directed to a first heat-exchanger to heat the polished feed stream. The second combustion gas may then be directed to a second heat-exchanger to heat the preheated air stream to form a heated air stream and a third combustion gas. The third combustion gas may then be directed to a third heat-exchanger to preheat the scrubbed feed stream to form a preheated feed stream and a fourth combustion gas prior to the feed stream polishing step. The fourth combustion gas may then be directed to a fourth heat-exchanger to heat the pressurized syngas to form the heated syngas and a fifth combustion gas. In one embodiment, the fifth combustion may be discharged to atmosphere. In another embodiment, the fifth combustion gas may be directed to the carbon dioxide capture system. The first, second, third, and fourth heat-exchangers may be of any suitable design, these specifics known to one skilled in the art and not specified herein.

In some embodiments of the present invention, the oxygen-containing stream may be directed to the light fuel gas burner for combustion. In some embodiments of the present invention, the light fuel gas burner may be supplied with compressed air. In some further embodiments of the present invention, a single compressor may compress the air stream feeding the SOEC and the air stream feeding the light fuel gas burner. The fraction of air needed to combust the light fuel gas may be metered to the burner as needed. The specific amounts of light fuel gas and air needed in the light fuel gas burner may be such that the SOEC feed stream and air stream temperatures may be at the desired set points for the electrolytic reactions.

In some embodiments, the first, second, third, fourth and fifth combustion stream may be the same stream or may be different streams.

FIG. 1 illustrates an integrated syngas and liquid fuel production system 100. A carbon dioxide containing stream 101 may be scrubbed in a scrubbing system 102 to remove some or all of the hydrogen sulfide contained in the stream. The scrubbed stream may then be preheated using a heat-exchanger 104. The heating medium to the heat-exchange 104 may be combustion gas from the light fuel gas burner 122, which may be directly supplied from the light fuel gas burner 122 or may be from another heat source. The preheated carbon dioxide containing feed stream may then be polished in a polishing device 106 to remove most of the remaining hydrogen sulfide. By way of example only, the polishing device 106 may be a zinc oxide bed. The polished carbon dioxide feed stream may then be mixed with steam stream 107 and/or hydrogen recycle gas stream 109 to produce an enriched feed stream. The steam stream 107 and/or the hydrogen recycle gas stream 109 may be produced in the gas-to-liquid conversion process 134 that produces the liquid fuels (e.g. Fisher-Tropsch process). The hydrogen recycle stream 109 from the pressure swing adsorption (PSA) system 138 may be a recycle stream derived from the syngas produced by the SOEC 110. The enriched feed stream may then be heated to the SOEC's 110 operating temperature (e.g. about 800° C.) in a heat-exchanger 108, which may use the combustion gas from the light fuel gas burner 122. Air may be compressed using a compressor 120, and preheated using a heat-exchanger 118. The compressed air may also be used in the light fuel gas burner 122. The preheated air exiting the heat-exchanger 118 may then be heated to the SOEC's 110 target temperature (between about 750° C. to about 850° C., in some embodiments about 800° C.), in a heat-exchanger 116. The preheated compressed air enters the SOEC 110 at the anode 114 and produces an oxygen-enriched stream. The oxygen-enriched stream produced in the SOEC's anode 114 may be used as the heating medium in the heat-exchanger 118 and/or in the light fuel gas burner 122. The heated feed stream exiting the heat-exchanger 108 may be fed to the SOEC 110 at the cathode 112, where the electrolytic reactions produce oxygen, hydrogen and carbon monoxide (syngas). Power may be supplied to the SOEC 110. The syngas may be directed to a heat-exchanger 124 to vaporize water and superheat steam. The superheated steam may be mixed with the polished carbon dioxide feed stream prior to entering the heat-exchanger 108. The syngas may be cooled in a heat-exchanger 126 to at least about the dew point of water to condense water from the syngas to produce a dry syngas. The dry syngas may be compressed using a compressor 128 and heated using a heat-exchanger 130 to at least about 240° C. The heating medium to heat exchanger 130 may be directly from the light fuel gas burner 122 combustion gas or may be from a heat exchanger. The heated dry syngas stream may then be split using a splitter 132 to produce a syngas side-stream and a main syngas stream. The side-stream may comprise at most about 4 mass % of the original syngas stream. The remainder of the heated dry syngas may be fed to the gas-to-liquid conversion process 134 (e.g. Fisher-Tropsch) to produce the liquid fuels, including diesel, jet, gasoline and light fuel gas. Some or all of the light fuel gas may be recycled to the light fuel gas burner 122 to produce the heat required in the upstream part of the process (e.g. SOEC 110) and/or may be stored in the light fuel gas storage 140. The syngas side-stream may be processed further in a water-gas-shift reactor 136 to produce hydrogen. The shifted syngas stream may be subsequently directed to a PSA system 138 to preferentially separate the hydrogen from the remainder of the shifted syngas stream. The separated hydrogen stream may then be recycled back to the upstream process, for example it may be mixed with steam and the carbon dioxide containing feed stream to feed the SOEC 110. Some or all of the hydrogen stream from the PSA system 138 may also be directed to the Gas-to-Liquid conversion process 134, for use in the hydrotreating of naptha and distillate streams, or for wax hydrocracking (See FIG. 3). The remaining light fuel gas may be stored in the light fuel gas storage 140.

Figure 2:
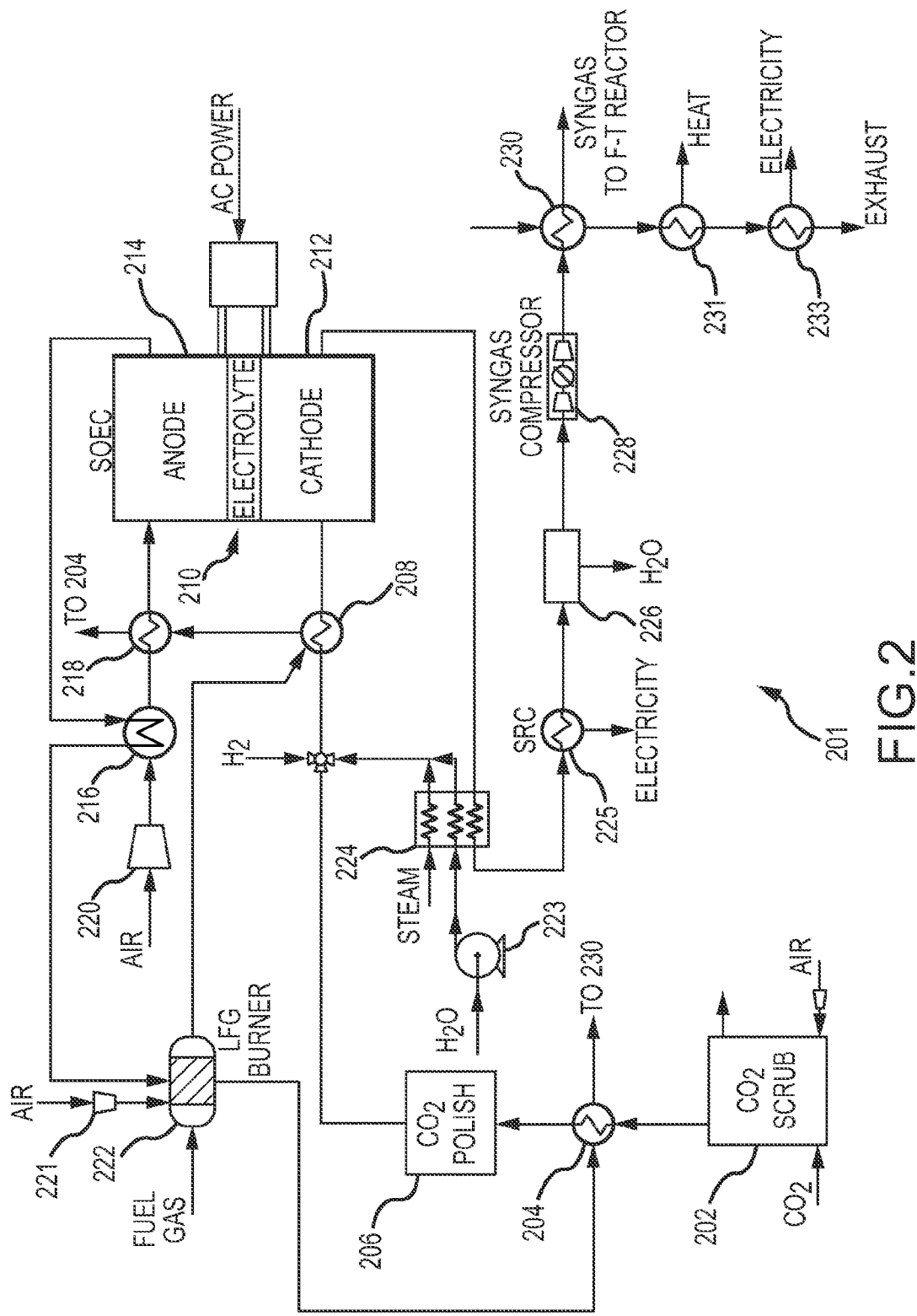
FIG. 2 illustrates a flow diagram of an SOEC syngas producing process.

FIG. 2 illustrates the upstream system 201 for syngas production, including the integrated use of LFG combustion with a burner 222 for providing the heating requirements of the heat-exchanger 208. The carbon dioxide stream may enter a CO2 scrubber 202 (e.g. LO-CAT Process™) to remove at least some of the hydrogen sulfide present in the carbon dioxide stream to produce a scrubbed feed stream. The scrubbed feed stream may then be preheated in a heat-exchanger 204, wherein the preheating may be accomplished using combustion gas from the LFG burner 222. This preheated feed stream may then be polished in a zinc oxide bed 206 to remove most of the remaining hydrogen sulfide. The polished feed stream may be combined with hydrogen and steam (which may be produced from previously compressed water in compressor 223, which may have been previously processed in heat exchanger 224) and preheated in heat-exchanger 208. The preheated polished feed stream may be fed into the SOEC 210 at the cathode 212. Following the reaction in the SOEC 210, syngas is produced and exits the SOEC 210. The syngas enters a heat-exchanger 224 where steam is produced and may be provided to the polished feed stream. The heat exchanger 224 heats the syngas. The heated syngas stream then enters the condenser 226, where water is removed. The syngas compressor 228 compresses the syngas. Heat exchangers 230, 231 and 233 may be used to heat the syngas, which may be provided to the Fisher-Tropsch reactor, and/or other processes.

The air fed to the upstream process 201 may comprise two separate air streams, wherein the first air stream may be compressed utilizing a compressor 221 and may be fed to the LFG burner 222. The second air stream may be compressed utilizing another compressor 220. It is understood that a single unit may be used, for example a single compressor, where the fluid exiting the unit may be directed to multiple subsequent units. Air exiting compressor 220 may be heated in heat-exchanger 218 and heat exchanger 216. Thermal energy remaining from heat exchanger 208 may be used to heat the compressed air in heat exchanger 218. The preheated air may be provided to the SOEC 210 at the anode 214. FIG. 2 also illustrates that steam Rankine cycle systems may be utilized to capture some of the syngas sensible and/or latent heat and the LFG combustion gas sensible and/or latent heat to produce electricity (see heat exchangers 225 and 233 respectively). The LFG combustion gas sensible and/or latent heat may also be employed for Fisher-Tropsch upgrading utilizing heat-exchanger 231, thus providing some of the heat required for the Fisher-Tropsch processing steps (e.g. the catalytic reformer 360 of FIG. 3).

Figure 3:
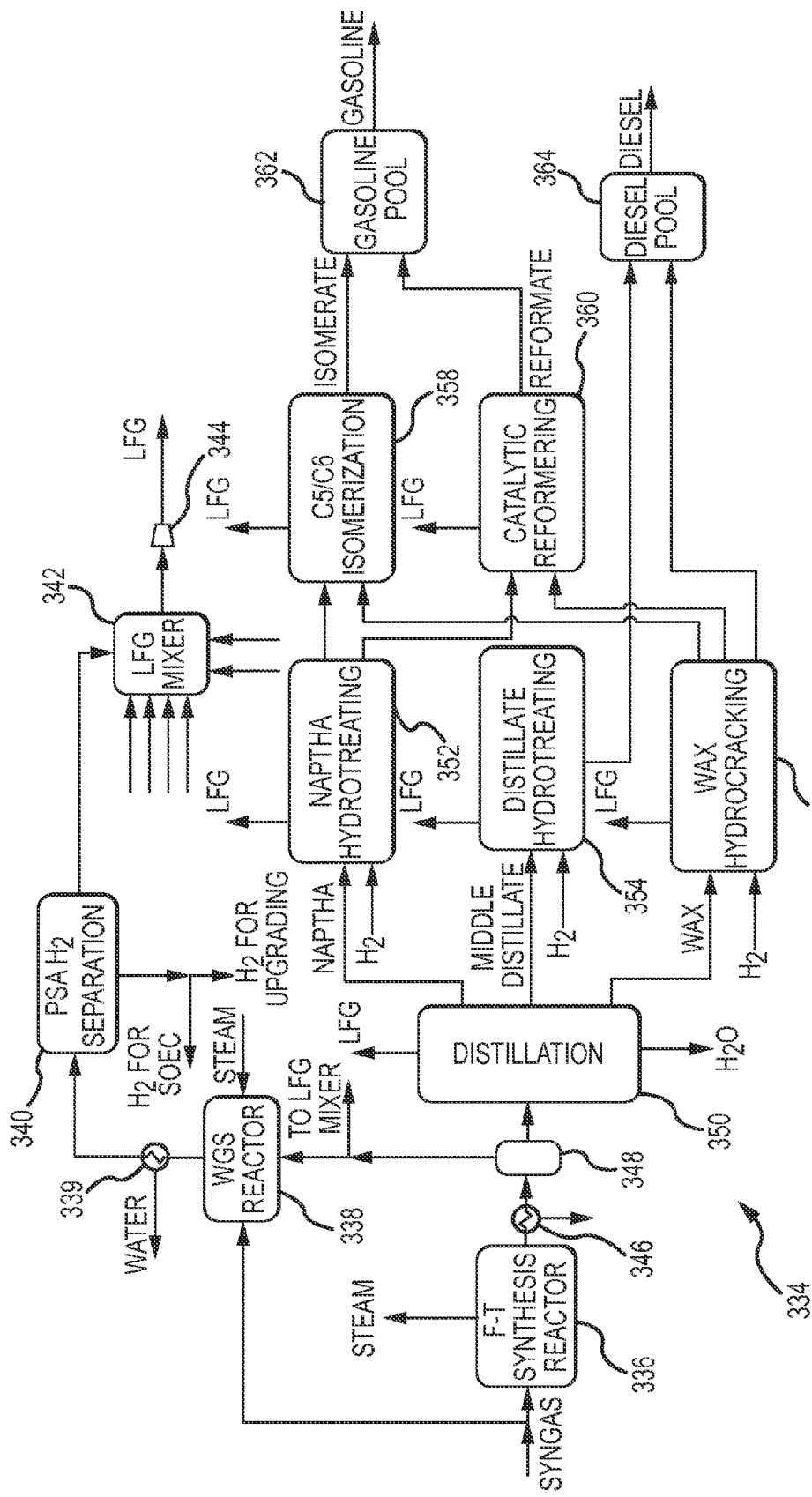
FIG. 3 illustrates a flow diagram of an integrated Fisher-Tropsch gas-to-liquid process.

FIG. 3 illustrates a downstream gas-to-liquid conversion system 334. A Fisher-Tropsch system may comprise a Fisher-Tropsch synthesis reactor 336 for processing the incoming syngas stream (e.g. syngas production illustrated in FIGS. 1 and 2). Following processing in the Fischer-Tropsch synthesis reactor 336, the stream is cooled in heat exchanger 346 then provided to a flash drum 348. Some or all of the stream exiting the flash drum 348 is provided to a WGS reactor 338, where it is combined with syngas and steam. Water is removed from the exiting stream at a condenser 339 and the dehydrated stream is provided to a hydrogen separation chamber 340. Some or all of the hydrogen gas produced may be used elsewhere in the system 334 or in other parts of the overall system (e.g. the hydrogen gas may be directed to heat exchanger 208 shown in FIG. 2). LFG exiting the hydrogen separation chamber 340 may be mixed in a LFG mixer 342 (which may receive LFG from other units within the system, e.g. exiting the naptha hydrotreating 352 and/or the distillate hydrotreating 354, etc.), which may be provided to a compressor 344 and ultimately used elsewhere in the system 334 or other systems (e.g. to the LFG burner 222 illustrated in FIG. 2).

Some or all of the stream exiting the flash drum 348 may be provided to a distillation column 350 wherein the distillation column 350 may produce a naptha stream, a middle distillate stream, a wax stream. A naptha stream may be combined with hydrogen gas and processed in a naptha hydrotreating system 352 to create a hydrotreated stream. Some or all of the hydrotreated stream may be directed to an isomerization system 358 to create an isomerized stream. The isomerized stream may be combined with other streams in the gas storage tank 362. Another portion of the hydrotreated stream may be directed to a catalytic reforming system 360 to create a reformed stream, wherein the hydrotreated stream and the treated hydrocracking stream may be combined in the catalytic reformer 360. The reformate exiting the catalytic reformer 360 may be provided to the gas storage tank 362. The middle distillate stream may also be hydrotreated in a distillation hydrotreating system 354 to produce a hydrotreated distillate stream. LFG's exiting the distillation hydrotreating system 354 may be provided to the LFG mixer 342. The hydrotreated distillate stream may be provided to the diesel storage system 364. The wax stream exiting the distillation column 350 may processed in a wax hydrocracking system 356 to produce a hydrocracked stream. Some or all of the hydrocracked stream may be directed to the diesel storage tank 364. Some or all of the hydrocracked stream may be provided to the isomerization system 358. Some or all of the hydrocracked stream may be provided to the catalytic reformer 360. The distillation column 350, naptha hydrotreating system 352, the distillation hydrotreating system 354, wax hydrocracking system 356, isomerization system 358, and/or catalytic reforming system 360 may produce LFG, which may be collected and recycled to the LFG burner to provide the heat requirements of the SOEC system or may be combined in the LFG mixer 342.

Also referring to FIG. 3, the hydrogen utilized in the naptha hydrotreating 352, distillate hydrotreating 354, and the wax hydrocracking 356 may be obtained from the PSA separation unit 340. The treatment of the middle distillate stream and naphtha stream, in addition to the treatment in the isomerization system 358 and the catalytic reforming system 360 are optional. Alternatively, the middle distillate and naphtha streams can simply go to storage for transfer to a large-scale refinery, whereas the wax may be processed on-site into diesel.

Figure 4:
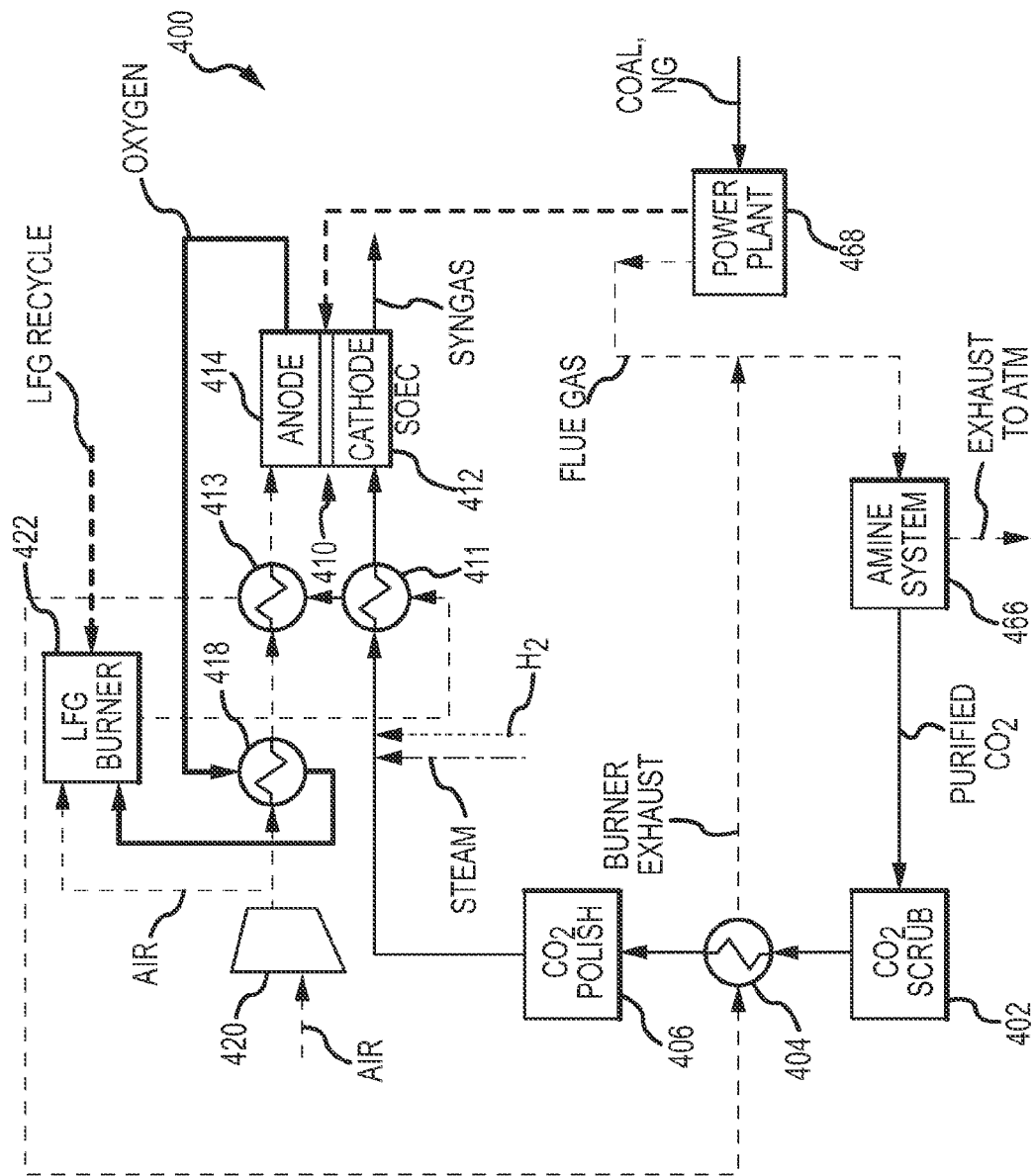
FIG. 4 illustrates a flow diagram of an SOEC syngas producing process integrated with a fossil-fuel burning power plant.

FIG. 4 illustrates a system 400 that utilizes a fossil fuel burning power plant 468 (e.g. coal or natural gas) as a possible carbon dioxide source for the SOEC 412. In one embodiment of the present invention, the $CO_2$ source is obtained from a natural gas oxy-combustion process. Some or all of the electric power produced by the power plant 468 may be used to provide the electrical energy requirements of the SOEC 410. The combustion gas, and/or flue gas, from the power plant 468 may provide the carbon dioxide for the SOEC 410. The flue gas may be treated in an amine treatment system 466 to produce a purified carbon dioxide stream comprising greater than 99 mole % purity. The purified carbon dioxide stream may be scrubbed in a $CO_2$ scrubber 402. The scrubbed $CO_2$ may be provided to a heat exchanger 404, which may be polished in a $CO_2$ polisher 406. The polished $CO_2$ may be combined with steam and hydrogen gas before it is sent to a heat exchanger 411. The heated stream exiting the heat exchanger 411 enters the SOEC 410 at the cathode 412 which produces syngas, which may be used in other processes.

Air is provided to a compressor 420. The compressed air may be provided to a burner 422 and/or a heat exchanger 418. The heat exchanger 418 may use heat from the oxygen stream produced in the SOEC 410 at the anode 414 to heat the compressed air. The oxygen stream is ultimately provided to the LFG burner 422. The heated air stream may be provided to the SOEC 410 at the anode 414 to produce the oxygen stream.

LFG produced in other processes (e.g. streams described with reference to FIG. 3) may be fed to the LFG burner 422. Heated gas leaving the LFG burner 422 may be used to heat one or more of the heat exchangers (411, 410, 418, 404) in the system.

EXAMPLES

Example 1

Table 1 provides estimated temperatures for streams at different points in the system 201. One having skill in the art would understand that the temperatures, pressures and flow rates may be altered without deviating from the invention. Thus, the values listed in Table 1 are not intended to limit the scope of the present invention. These process conditions may vary significantly around the values reported in the stream tables, by as much as ±20%, and/or as described elsewhere in this disclosure.

TABLE 1

Example stream properties for system illustrated in FIG. 2.

| Stream | Temperature (° C.) | Pressure (kPa) | Flow rate (kg/s) |
|---|---|---|---|
| CO2 entering 202 | 20 | 200 | 3.88 |
| Scrubbed feed stream | 20 | 190 | 3.85 |
| Preheated feed stream | 375 | 180 | 3.85 |
| Polished feed stream | 375 | 170 | 3.85 |
| Water entering compressor 223 | 30 | 100 | 0.63 |
| Water exiting compressor 223 | 30 | 180 | 0.63 |
| Steam exiting heat exchanger 224 | 600 | 170 | 3.02 |

TABLE 1-continued

Example stream properties for system illustrated in FIG. 2.

| Stream | Temperature (° C.) | Pressure (kPa) | Flow rate (kg/s) |
|---|---|---|---|
| Combined stream entering heat exchanger 208 | 495 | 170 | 6.89 |
| Heated compressed stream exiting heat exchanger 208 and entering SOEC 210 at cathode 212 | 800 | 160 | 6.89 |
| Syngas stream exiting SOEC 210 at cathode 212 | 800 | 150 | 3.75 |
| Syngas exiting heat exchanger 224 | 338 | 140 | 3.75 |
| Syngas exiting SRC 225 | 100 | 130 | 3.75 |
| Condensed syngas exiting condenser 226 | 30 | 120 | 3.05 |
| Syngas exiting compressor 228 | 125 | 4000 | 3.05 |
| Syngas exiting heat exchanger 230 (to FT reactor) | 240 | 3990 | 3.05 |
| Gas entering heat exchanger 230 | 829 | 130 | 16.64 |
| Gas entering heat exchanger 231 (may be used in heat exchanger 204) | 790 | 120 | 16.64 |
| Gas entering SRC 233 | 732 | 110 | 16.64 |
| Exhaust gas exiting SRC 233 | 100 | 100 | 16.64 |
| Air to compressor 220 | 20 | 100 | 4.57 |
| Heated air to heat exchanger 216 | 97 | 200 | 4.57 |
| Heated air to heat exchanger 218 | 772 | 190 | 4.57 |
| heated air to SOEC 210 at anode 214 | 800 | 180 | 4.57 |
| Oxygen exiting SOEC 210 at anode 214 | 800 | 170 | 7.21 |
| Oxygen exiting heat exchanger 216 | 400 | 160 | 7.21 |
| Heated gas exiting heat exchanger 218 (may be used to in heat exchanger 204) | 895 | 140 | 16.64 |
| Air entering compressor 221 | 20 | 100 | 7.21 |
| Compressed air entering LFG burner 222 | 75 | 160 | 7.21 |
| Fuel gas entering LFG burner 222 | 53 | 160 | 1.71 |
| Heated gas to heat exchanger (e.g. heat exchanger 208) | 1074 | 160 | 16.64 |
| Heat gas exiting the heat exchanger 208 | 902 | 150 | 16.64 |
| Steam entering the heat exchanger 224 | 225 | 180 | 2.38 |
| Hydrogen gas (recycled or new) combined with streams entering heat exchanger 208 | 40 | 170 | 0.03 |

Example 2

Table 2 provides estimated temperatures, pressures and flow rates for streams at different locations in the system 334. One having skill in the art would understand that the temperatures, pressures and flow rates may be altered without deviating from the invention. Thus, the values listed in Table 2 are not intended to limit the scope of the present invention. These process conditions may vary significantly around the values reported in the stream tables, by as much as ±20%, and/or as described elsewhere in this disclosure.

TABLE 2

Example streams properties for system illustrated in Figure 3.

| Stream | T (° C.) | Pressure (kPa) | Flow rate (kg/s) |
|---|---|---|---|
| Syngas entering FT reactor 336 | 240 | 3990 | 2.99 |
| Steam exiting FT reactor 336 | 225 | 2500 | 2.38 |
| Gas entering heat exchanger 346 | 240 | 3890 | 2.99 |
| Syngas entering WGS reactor 338 | 240 | 3990 | 0.06 |
| LFG (may be directed to LFG mixer 342) | 40 | 3600 | 1.04 |
| Gas entering the WGS reactor 338 | 40 | 3600 | 0.46 |
| Gas entering H2 separator system 340 | 40 | 3480 | 0.73 |
| Hydrogen gas exiting hydrogen separation chamber 340 directed to the SOEC | 40 | 3420 | 0.02 |
| Hydrogen gas exiting hydrogen separation chamber 340 directed to upgrading | 40 | 3420 | 0.01 |
| LFG entering compressor 334 | 40 | 100 | 0.64 |
| LFG exiting compressor 334 | 53 | 160 | 1.71 |
| Gasoline exiting gasoline storage 362 | 25 | 100 | 0.18 |
| Diesel exiting diesel storage 364 | 25 | 100 | 0.39 |

The foregoing examples of the present invention have been presented for purposes of illustration and description. Furthermore, these examples are not intended to limit the invention to the form disclosed herein. Consequently, variations and modifications commensurate with the teachings of the description of the invention, and the skill or knowledge of the relevant art, are within the scope of the present invention. The specific embodiments described in the examples provided herein are intended to further explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed:

1. A method for producing liquid fuels, comprising:
    providing a feed stream comprising carbon dioxide and water;
    heating the feed stream to produce a heated feed stream;
    compressing an air stream to produce a pressurized air stream;
    heating the pressurized air stream to produce a heated air stream;
    reacting the heated feed stream and the heated air stream in a solid oxide electrolytic cell in the electrolysis mode to form a syngas and an oxygen-containing stream, wherein the electrolytic cell comprises a cathode and an anode and a power supply;
    treating the syngas stream to produce a treated syngas stream; and
    converting the syngas to produce the liquid fuels in a gas to liquid subsystem.

2. The method of claim 1, wherein the cathode is at a temperature between about 750° C. to about 850° C., and the anode is at a temperature between about 750° C. to about 850° C.

3. The method of claim 1, wherein the cathode is at a pressure between about 1.0 bar to about 20.0 bar, and the anode is at a pressure between about 1.0 bar to about 20.0 bar.

4. The method of claim 1, wherein the cathode is at pressure between about 1.0 bar to about 2.0 bar, and an anode at a pressure between about 1.0 bar to about 2.0 bar.

5. The method of claim 1, further comprising preheating the air stream to produce a preheated air stream, wherein the oxygen-containing stream preheats the air stream utilizing a heat-exchanger.

6. The method of claim 1, wherein the preparing step further comprises removing a hydrogen sulfide from the feed stream to produce a scrubbed feed stream.

7. The method of claim 6, wherein the hydrogen sulfide is removed from the feed stream by a liquid oxidation method to form the scrubbed feed stream.

8. The method of claim 1, wherein the preparing further comprises:
    removing hydrogen sulfide by scrubbing the feed stream utilizing a liquid oxidation method to form a scrubbed feed stream;
    polishing the scrubbed feed stream utilizing a zinc oxide bed to produce a polished feed stream; and
    mixing hydrogen and steam with the polished feed stream to produce an enriched feed stream.

9. The method of claim 1, wherein the treating step comprises:
    separating condensable components from the syngas, wherein the condensable components comprise water, to produce dry syngas;
    compressing the dry syngas to produce a pressurized syngas;
    heating the pressurized syngas to produce a heated syngas; and
    splitting the heated syngas to produce a syngas sidestream and a main syngas stream.

10. A method for producing liquid fuels, comprising:
    providing a feed stream comprising carbon dioxide and water;
    removing hydrogen sulfide by scrubbing the feed stream utilizing a liquid oxidation method to form a scrubbed feed stream;
    polishing the scrubbed feed stream utilizing a zinc oxide bed to produce a polished feed stream;
    heating the polished feed stream to produce a heated feed stream, wherein the heated feed stream has a temperature between about 800° C. to about 850° C.;
    compressing an air stream to a pressure between about 1.0 bar to about 2.0 bar to produce a pressurized air stream;
    heating the pressurized air stream to produce a heated air stream, wherein the heated air stream has a temperature of about 750° C. to about 850° C.;
    reacting the heated feed stream and the heated air stream in a solid oxide electrolytic cell to form a syngas and an oxygen-containing stream;
    separating condensable components from the syngas to produce a dry syngas, wherein the condensable components comprise water, and wherein condensing comprises cooling the syngas to a temperature of less than about 50° C.;

compressing the dry syngas to produce a pressurized syngas, wherein the pressurized syngas has a pressure of at least about 35 bar;

heating the dry syngas to produce a heated syngas, wherein the heated syngas has a temperature of at least about 800° C.;

splitting the dry syngas to produce a syngas side-stream and a main syngas stream, wherein the syngas side-stream comprises less than about 5 mass % of the dry syngas stream and the main syngas stream comprises the remainder of the heated syngas;

providing the syngas side-stream utilizing a water-gas shift reactor to produce a shifted syngas stream with a hydrogen content higher than a hydrogen content of the syngas side-stream;

separating at least a portion of the hydrogen content from the shifted syngas stream to produce a hydrogen recycle stream;

feeding the hydrogen recycle stream to the feed stream heating step; and converting the main syngas stream to the liquid fuels.

11. The method of claim 10, wherein the liquid fuel is selected from the group consisting of diesel, jet, gasoline, light fuel gas, and mixtures thereof.

12. The method of claim 10, wherein the converting step utilizes Fisher-Tropsch processing to produce the liquid fuels.

13. The method of claim 12, wherein the Fisher-Tropsch processing further comprises:

producing a steam stream; and combining the steam stream with the polished feed stream to produce an enriched feed stream.

14. The method of claim 11, further comprising combusting the light fuel gas to produce a first combustion gas in a burner.

15. The method of claim 11, further comprising:

combusting the light fuel gas stream to produce a first combustion gas;

a first feeding step, wherein the first combustion gas is fed to a first heat-exchanger to heat the polished feed to produce a second combustion gas and the heated feed stream;

a second feeding step, wherein the second combustion gas is fed a second heat-exchanger to heat the pressurized air stream to produce a third combustion gas and the heated air stream;

a scrubbed feed stream heating step, wherein the third combustion gas is fed to a third heat-exchanger to heat the scrubbed feed stream using the third combustion gas to produce a fourth combustion gas and a preheated scrubbed feed stream; and a third feeding step, wherein the fourth combustion gas is fed to a fourth heat-exchanger to heat the dry syngas to produce a fifth combustion gas and the heated syngas.

16. The method of claim 1, further comprising:

an electric power generating step that produces a waste gas comprising carbon dioxide and electrical power;

feeding a portion of the electrical power to the solid oxide electrolytic cell (SOEC) power supply;

a carbon dioxide capture step that treats the waste gas to produce a purified carbon dioxide stream, wherein the purified carbon dioxide stream is greater than 99.9 vol % pure in carbon dioxide; and feeding the purified carbon dioxide stream to the preparing step.

17. The method of claim 16, wherein the carbon dioxide capture step is achieved by a method that is selected from the group consisting of absorption, cryogenic processing, membrane separation, adsorption, oxy-combustion, and combinations thereof.

18. The method of claim 16, wherein the carbon dioxide capture step is by absorption utilizing a liquid amine.

19. The method of claim 18, wherein the liquid amine is either Selexol or Rectisol.

20. The method of claim 10, wherein the solid oxide electrolytic cell in the electrolysis mode.

* * * * *